(No Model.) 2 Sheets—Sheet 1.

G. D. BAIRD.
CORN PLANTER.

No. 414,789. Patented Nov. 12, 1889.

Witnesses

Inventor
George D. Baird
By his Attorneys (No Model.) 2 Sheets—Sheet 2.
G. D. BAIRD.
CORN PLANTER.
No. 414,789. Patented Nov. 12, 1889.
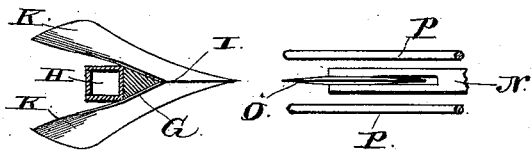
Fig. 3.
Fig. 4.
Fig. 5.
Witnesses
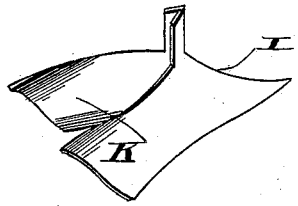
Inventor
George D. Baird
By his Attorneys

UNITED STATES PATENT OFFICE.

GEORGE DALAS BAIRD, OF AMBOY, ILLINOIS.

CORN-PLANTER.

SPECIFICATION forming part of Letters Patent No. 414,789, dated November 12, 1889.

Application filed November 24, 1888. Serial No. 291,738. (No model.)

*To all whom it may concern:*

Be it known that I, GEORGE DALAS BAIRD, a citizen of the United States, residing at Amboy, in the county of Lee and State of Illinois, have invented a new and useful Improvement in Corn-Planters, of which the following is a specification.

My invention relates to an improvement in corn-planters; and it consists in the peculiar construction and combination of devices that will be more fully set forth hereinafter, and particularly pointed out in the claim.

Figure 1:
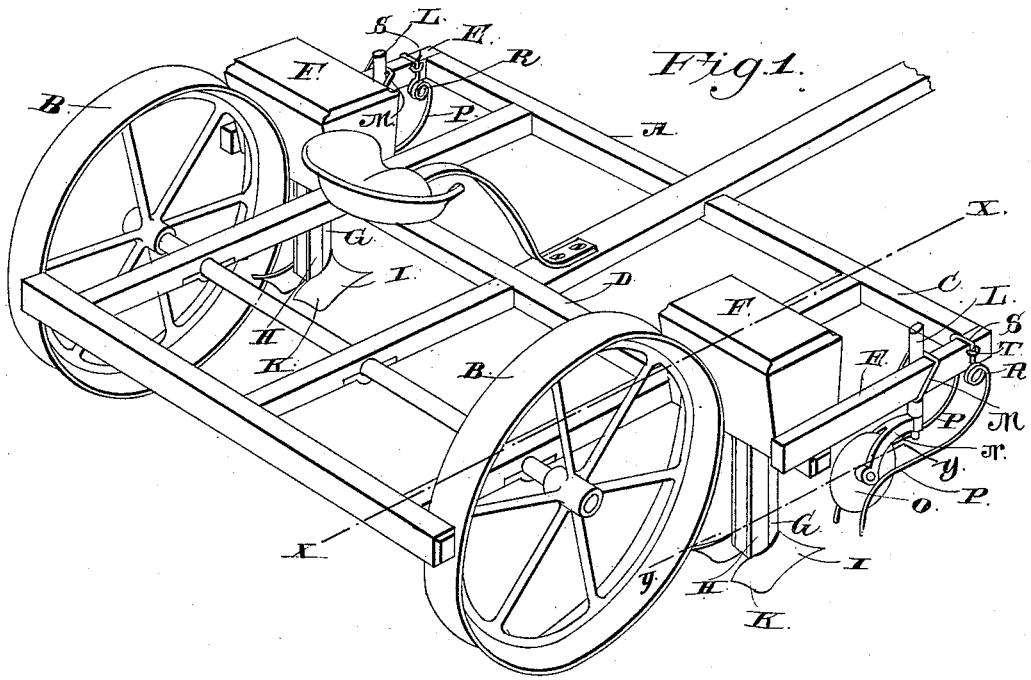
Figure 2:
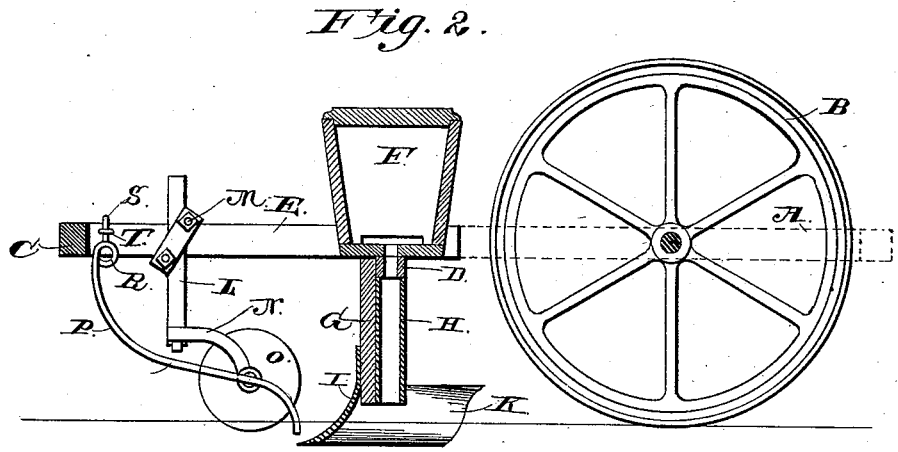

In the drawings, Figure 1 is a perspective view of a corn-planter provided with the devices embodying my improvement. Fig. 2 is a vertical sectional view taken on the line $x\ x$ of Fig. 1. Fig. 3 is a horizontal sectional view taken on the line $y\ y$ of Fig. 1. Figs. 4 and 5 are detailed views.

A represents the frame of the planter, which is of the usual construction, and is provided with the driving and supporting wheels B. The front bar C of the frame projects beyond the sides thereof.

D represents a cross-bar, which connects the side bars of the frame and is arranged at a suitable distance in rear of the bar C. The ends of the bar D also project beyond the sides of the frame. The outer ends of the bars C D are connected by longitudinal bars E.

F represents the hoppers. The seed-slide is not shown nor described, for the reason that it may be of any preferred construction, and forms no part of my present invention.

From the hoppers F depend standards G, which are hollow on their rear sides to form conductors H to carry the seeds from the hopper to the furrows. To the lower ends of the standards G are secured furrow-openers I, which may be of any desired shape and construction, and are provided with rearwardly-extending diverging wings K, arranged at a slight inclination and adapted to cut through the soil at a depth of a few inches below the surface and to drop the soil into the furrow behind the standard, and thereby cover the seeds with freshly-stirred soil, and to effectually kill the weeds to a distance of several inches on each side of the furrow, and thereby enable the corn to get a good start and prevent it becoming choked with weeds.

L represents a pair of standards, which are bolted in a vertical position to the sides of the bars E at a suitable distance in advance of the furrow-openers and in line therewith by means of U-shaped clamping-bolts M. To the lower ends of the said standards are swiveled curved bifurcated arms N, between the forks of which are journaled circular revoluble colters O, the said colters serving to cut the earth in advance of the furrow-openers and to cut through stalks, trash, and small roots, and thereby clear the way for the furrow-opener, as will be readily understood.

P represents curved teeth, which are bent from steel rods of suitable length and thickness, are provided at their upper ends with spring-coils R, and are connected together by inverted-U-shaped saddles S, which rest astride the bars E at a suitable distance in advance of the standards L, and are secured to the said bars by keepers T. The springs, teeth, and saddle are formed integrally and from the same piece of rod, and the teeth are disposed on opposite sides of the revolving colter and in proximity thereto, and serve to remove trash from the path of the furrow-opener.

It will be observed by reference to the drawings that the colters, furrow-openers, and wheels B are in line with each other, and thereby the said wheels B are adapted to roll the earth which covers the seeds and compact the earth above the seeds so as to retain its moisture, and thereby assist in the speedy germination of the seeds.

Having thus described my invention, I claim—

In a corn-planter, the combination of the frame, the standards bolted to the same and having swiveled bifurcated arms, the revolving colters journaled in the latter, the spring-teeth formed with saddles straddling the frame-beams in front of the colters, said spring-teeth extending downwardly on each side of the latter, the furrow-openers attached to the lower ends of the seed-spouts, and the supporting and covering wheels arranged in a line with the colters and the furrow-openers, all combined and operating substantially as set forth.

In testimony that I claim the foregoing as my own I have hereto affixed my signature in presence of two witnesses.

GEORGE DALAS BAIRD.

Witnesses:
W. H. BADGER,
J. F. LYMAN.